(12) United States Patent
Seren et al.

(10) Patent No.: US 9,686,340 B2
(45) Date of Patent: *Jun. 20, 2017

(54) DATA STREAM CLASSIFICATION

(71) Applicant: Cisco Technology, Inc., San Jose, CA (US)

(72) Inventors: Cetin Seren, Pleasanton, CA (US); Jisheng Wang, San Mateo, CA (US); Sharad Ahlawat, San Jose, CA (US); Yingqi Xu, San Jose, CA (US); Vijaya Sarathy Kasi, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,163

(22) Filed: Apr. 25, 2016

(65) Prior Publication Data
US 2016/0241628 A1    Aug. 18, 2016

Related U.S. Application Data

(63) Continuation of application No. 14/794,358, filed on Jul. 8, 2015, now Pat. No. 9,350,785, which is a
(Continued)

(51) Int. Cl.
*H04L 29/06* (2006.01)
*H04L 12/851* (2013.01)
(Continued)

(52) U.S. Cl.
CPC .......... *H04L 65/80* (2013.01); *G06N 99/005* (2013.01); *H04L 12/2615* (2013.01);
(Continued)

(58) Field of Classification Search
CPC ............ H04L 47/2475; H04L 47/2441; H04L 12/2615; H04L 47/2483; G06N 99/005
See application file for complete search history.

(56) References Cited

U.S. PATENT DOCUMENTS

2003/0229710 A1* 12/2003 Lie ...................... H04L 12/5693
709/231
2005/0229244 A1   10/2005 Khare et al.
(Continued)

OTHER PUBLICATIONS

U.S. Appl. No. 14/794,358, filed Jul. 8, 2015, Office Action, Oct. 21, 2015.
U.S. Appl. No. 14/794,358, filed Jul. 8, 2015, Notice of Allowance, Feb. 1, 2016.
U.S. Appl. No. 13/872,960, filed Apr. 29, 2013, Office Action, Sep. 26, 2014.
(Continued)

*Primary Examiner* — Ajay Cattungal
(74) *Attorney, Agent, or Firm* — Malgorzata A. Kulczycka; Hickman Palermo Becker Bingham LLP

(57) ABSTRACT

Systems, methods, and other embodiments associated with data stream classification are described. One example method includes identifying packets associated with the data stream. The example method may also include updating a set of characterization data associated with the data stream based on information associated with a packet. The example method may also include assigning a data stream classifier to the data stream by comparing characterization data to identification data upon determining that the set of characterization data indicates that the data stream is able to be classified. The example method may also include providing a signal associated with the data stream classifier.

20 Claims, 6 Drawing Sheets

Related U.S. Application Data continuation of application No. 13/872,960, filed on Apr. 29, 2013, now Pat. No. 9,106,432, which is a continuation of application No. 12/392,186, filed on Feb. 25, 2009, now Pat. No. 8,432,919.

(51) Int. Cl.

| | | |
|---|---|---|
| *G06N 99/00* | (2010.01) | |
| *H04L 12/859* | (2013.01) | |
| *H04L 12/26* | (2006.01) | |
| *H04L 12/741* | (2013.01) | |
| *H04L 29/12* | (2006.01) | |
| *H04L 29/08* | (2006.01) | |

(52) U.S. Cl.
CPC .............. *H04L 43/04* (2013.01); *H04L 43/16* (2013.01); *H04L 45/74* (2013.01); *H04L 47/2441* (2013.01); *H04L 47/2475* (2013.01); *H04L 47/2483* (2013.01); *H04L 61/2007* (2013.01); *H04L 65/60* (2013.01); *H04L 65/602* (2013.01); *H04L 67/02* (2013.01); *H04L 69/22* (2013.01)

(56) References Cited

U.S. PATENT DOCUMENTS

| | | | |
|---|---|---|---|
| 2007/0038705 A1* | 2/2007 | Chickering | H04L 51/12 709/206 |
| 2007/0076606 A1* | 4/2007 | Olesinski | H04L 41/0893 370/230 |
| 2007/0214504 A1* | 9/2007 | Milani Comparetti | H04L 63/1408 726/23 |
| 2008/0037427 A1* | 2/2008 | Kist | H04L 41/0896 370/235 |
| 2009/0138427 A1* | 5/2009 | Kalavade | G06Q 10/0637 |
| 2009/0138471 A1* | 5/2009 | Zhang | H04L 69/18 |
| 2010/0095367 A1* | 4/2010 | Narayanaswamy | H04L 63/0245 726/12 |
| 2010/0177674 A1* | 7/2010 | Aggarwal | H04L 45/02 370/312 |
| 2015/0312312 A1 | 10/2015 | Seren et al. | |

OTHER PUBLICATIONS

U.S. Appl. No. 13/872,960, filed Apr. 29, 2013, Notice of Allowance, Apr. 21, 2015.

* cited by examiner

DATA STREAM CLASSIFICATION

BENEFIT CLAIM

This application claims the benefit and priority under 35 U.S.C. §120 as a Continuation of application Ser. No. 14/794,358, filed Jul. 8, 2015, which is a continuation of application Ser. No. 13/872,960, filed Apr. 29, 2013, now U.S. Pat. No. 9,106,432 issued on Aug. 11, 2015, which is a continuation of application Ser. No. 12/392,186, filed Feb. 25, 2009, now U.S. Pat. No. 8,432,919 issued on Apr. 30, 2013, the entire contents of which are hereby incorporated by reference as if fully set forth herein. The applicants hereby rescind any disclaimer of claim scope in the parent applications or the prosecution history thereof, and advise the USPTO that the claims in this application may be broader than any claim in the parent applications.

BACKGROUND

Routers throughout networks (e.g., the Internet), may be configured to process network traffic based on information contained in the network traffic itself. For example, some companies have tried to manipulate quality of service settings for packets associated with file sharing applications. Conventional methods may attempt deep packet inspection (DPI) to detect an application with which a packet is associated. DPI is the act of examining packet payload contents. However, DPI is unreliable as DPI may have difficulty making an accurate determination when the contents of the payload are encrypted. Additionally, DPI may be slow and/or resource intensive (e.g., memory, processing, and so forth). Thus, regular use of DPI may introduce latency in network devices causing network slowdowns and reducing data transfer speeds. Further some DPI implementations may have high false positive rates, and false negatives may be introduced by manipulating packet payloads with polymorphic techniques (e.g., computer viruses that rewrite their code).

Some routers use statistical classification techniques to augment other classification techniques instead of using DPI. However, some conventional statistical classification techniques are computationally high cost, slow, and therefore impractical for some typical classification scenarios. Additionally, some conventional statistical classification techniques do not reach a conclusion about a given data stream until after the stream has terminated.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element In some examples, an element shown as an internal component of another element may be implemented as an external component and vice versa. Furthermore, elements may not be drawn to scale.

BRIEF OVERVIEW

Figure 1:
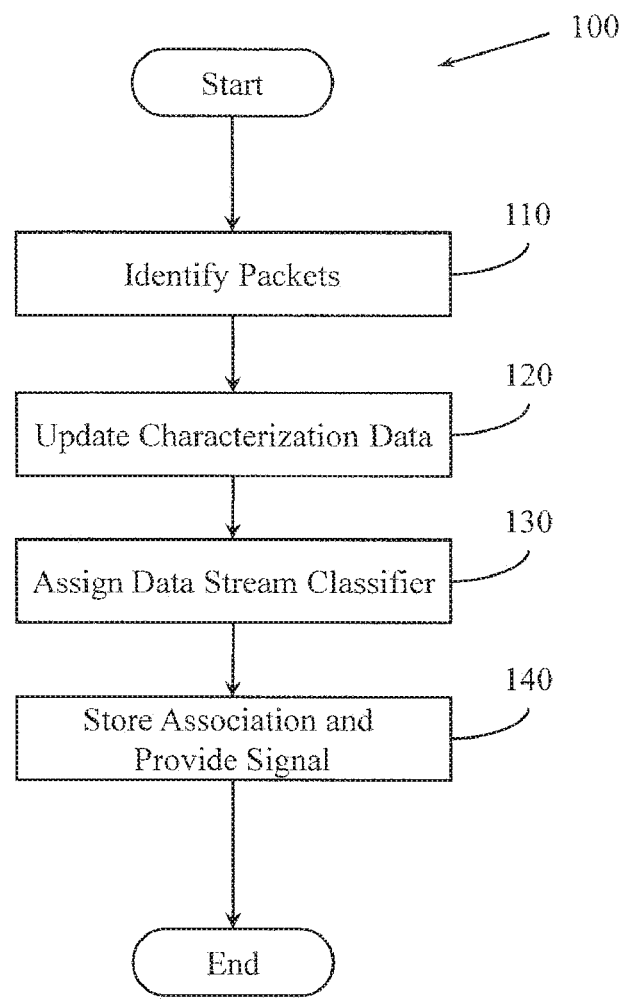
FIG. 1 illustrates an example method associated with data stream classification.

Systems and methods associated with data stream classification are described. One example method includes controlling a computer to identify packets associated with a data stream and to update characterization data associated with the data stream based on information derived from packets. Upon determining that enough characterization data has been acquired to classify the data stream, the computer may compare the characterization data to training data to attempt to determine the application with which the data stream is associated. In one example, the computer may adjust quality of service settings for the data stream based on the application. Thus, the computer may set a high quality of service value for applications where quality of service has a high impact on application function (e.g., voice over internet protocol (VoIP) applications, online games, streaming media, and so forth). The computer may set a low quality of service value for applications where quality of service has a low impact on application function (e.g., file transfer application, file sharing applications, and so forth). While an example associated with quality of service is described, a person having ordinary skill in the art will recognize that there may be other applications for data stream classification. For example, network activity analysis and reporting tools may also rely on data stream classification solutions.

Determining whether enough characterization data has been acquired may include examining a packet and storing information associated with the packet in several running totals. The totals may include a packet size total and an interval between packets total. After a predetermined number of packets have been examined, the computer may calculate a statistical property (e.g., average, standard deviation, and so forth) and compare the value to a previous value of the statistical property. The computer may then modify a counter based on this comparison and then check whether the counter has achieved a threshold value. The threshold value may indicate that statistics associated with the data stream have converged to stable values and thus, a classification may be made by comparing the characterization data to preconfigured training data. By performing low computation statistical comparisons, the method may facilitate classifying data streams at a low resource cost and at a high accuracy rate. Additionally the statistical comparisons may be impacted less by data encryption and/or polymorphic techniques.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 3:
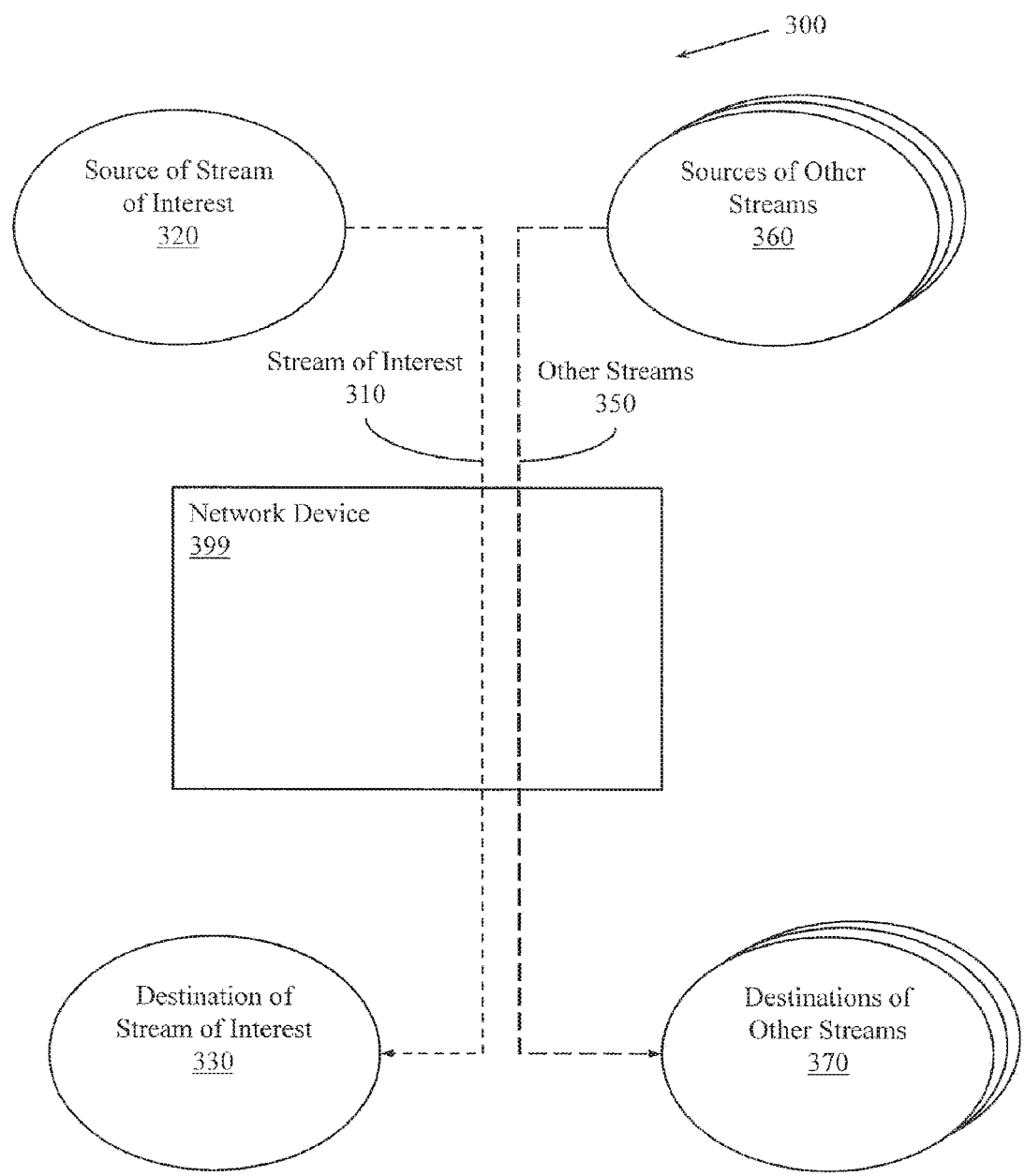
FIG. 3 illustrates an example network in which example systems and methods, and equivalents, may operate.

The term "data stream", as used herein refers to a sequence of packets transmitted from a source device to a destination device. A data stream is also associated with an application. By way of illustration, FIG. 3 illustrates an example network 300 in which example systems and methods, and equivalents, may operate. The network 300 may include a network device 399. Network device 399 may process multiple data streams simultaneously including a stream of interest 310. The stream of interest 310 may be provided by a source 320 of the stream of interest to a destination 330 of the stream of interest. The network device 399 may also be processing other streams 350 that are being provided by sources 360 of the other streams to destinations 370 of the other streams. In one example, there may be additional data streams initiating and/or terminating from the source 320 of the stream of interest and/or the destination 330 of the stream of interest that are passing through network device 399. While one stream of interest 310 is described, a person having ordinary skill in the art can see how there may be multiple streams of interest starting at source 320 and arriving at destination 330. A person having ordinary skill in the art can also see how some of these multiple streams may share an application but still be different streams (e.g., two different file transfers, separate audio and video data streams, and so forth).

In one example, a data stream may be described by a 5-tuple flow definition. The 5-tuple flow definition may uniquely identify a data stream. However, as described above, two streams from the same source going to the same destination associated with the same application may share the same 5-tuple flow definition. In this case, an additional differentiator (e.g., tracking packet numbering) may be used to differentiate the data streams.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur In different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with data stream classification. Method 100 includes, at 110, identifying packets associated with a data stream. As described above, a data stream comprises a sequence of packets transmitted from a source device to a destination device and is associated with an application (e.g., a VONAGE® voice over internet protocol (VoiP) application, a SKYPE® VoiP application, an online gaming application, and so forth). Identifying a packet associated with the data stream may comprise comparing a set of state data associated with the packet to a 5-tuple flow definition that describes the data stream. Thus determining if a packet matches a 5-tuple flow definition of a data stream may include examining a source internet protocol (IP) address, a destination IP address, a source port address, a destination port address, and a protocol associated with the packet. However, as described above, the 5-tuple flow definition may not be sufficient for differentiating between all data streams.

Method 100 also includes, at 120, updating a set of characterization data associated with the data stream. Updating the set of characterization data at 120 may be based on a piece of information associated with a packet. However, a person having ordinary skill in the art can see how other factors may influence updating the set of characterization data. Updating the set of characterization data may comprise summing a packet size value into a packet size total, summing a square of the packet size value into a square of packet size total, summing an interval between packets value into a packet interval total, and summing a square of the interval between packets value into a square of packet interval total. Thus, the packet size total may facilitate determining an average packet size value, the square of packet size total may facilitate determining a standard deviation of packet size value, and so forth. In one example, the characterization data may facilitate identifying the application with which the data stream is associated. While four totals and calculations are described, a person having ordinary skill in the art can see how a greater and/or lesser number of totals and/or calculations may be applicable.

Method 100 also includes, at 130, assigning a data stream classifier to the data stream. The data stream classifier may be determined by comparing a portion of the set of characterization data to a set of identification data. Identification data may be preconfigured training data. This training data may have been acquired or may have been learned by analyzing previous data streams. Comparing characterization data to identification data may include comparing average packet size data, standard deviation of packet size data, average interval time between packets data, standard deviation of interval time between packets data, and so forth. Comparing the set of characterization data to the identification data may be performed upon determining that the set of characterization data indicates that a threshold probability that the data stream is able to be classified has been achieved.

Whether the threshold probability has been achieved may be determined by monitoring a counter. The counter may be modified by comparing a current value of a statistical property of packets from the data stream (e.g., average packet size, standard deviation of packet interval, and so forth) to a previous value of the statistical property. The current value of the counter may be based on a set of data associated with a set of N consecutive most recently received packets. The previously calculated value may be based on a set of data associated with a set of M consecutive packets that are a subset of the N consecutive most recently received packets. In this example, M and N are integers. When the counter reaches a predetermined value, the counter may indicate that the threshold probability has been achieved. A person having ordinary skill in the art can recognize the tradeoff that may exist in using a higher or lower value for the counter. For example, a lower value may decrease the time before a determination is attempted, but may reduce the accuracy of the determination.

In one example, the threshold probability may indicate that one or more statistical properties have converged to stable values. For example, a data stream may include setup data in some initial packets in the data stream and then begin to send packets that have a detectable pattern. This pattern may be related to settings associated with an application. By way of illustration, a video streaming application may include a set number of video frames in packets once an initial setup has been performed. These frames may have similar sizes and thus, packet size may have little deviation over the course of the data stream once the setup has completed. Similarly, the video stream may also be configured to provide packets containing the frames at a fixed rate. A person having ordinary skill in the art can see how this rate may be affected by network fluctuations. However the average rate and the standard deviation of the packet rate may converge to stable values over time. These converged values may then be compared to training data for application identification purposes.

"Signal", as used herein, includes but is not limited to, electrical signals, optical signals, analog signals, digital signals, data, computer instructions, processor instructions, messages, a bit, a bit stream, and so on, that can be received, transmitted and/or detected.

Method 100 also includes, at 140, storing an association between the data stream classifier and the data stream, and providing a signal associated with the data stream classifier. In one example the data stream classifier may identify an application. Thus, storing the association between the data stream and the data stream classifier may indicate that the data stream originated from the identified application. The application may be, for example, a VoiP application (e.g., a SKYPE® VoiP application, a VONAGE® VoiP application, and so forth), a file sharing application, a file transfer protocol (FTP) application, an internet browser, a chat application, a gaming application, a video application, an audio application, a conferencing application, and so forth.

By way of illustration, a first person, Wade, may call a second person, Dalton, using a voice over internet protocol application. If the data stream associated with the call passes through a network device configured to perform method 100, the device may attempt to determine the type of application with which the data transfer is associated. The network device may examine packet sizes and packet receipt rate of the data stream and after a time determine that the application is in fact a VoiP application and is therefore, a time sensitive communication.

While FIG. 1 illustrates various actions occurring in serial, it is to be appreciated that various actions illustrated in FIG. 1 could occur substantially in parallel. By way of illustration, a first process could identify packets from a data stream, a second process could update characterization data, a third process could assign a data stream classifier to the data stream, and a fourth process could store a classifier and provide a signal. While four processes are described, it is to be appreciated that a greater and/or lesser number of processes could be employed and that lightweight processes, regular processes, threads, and other approaches could be employed.

In one example, a method may be implemented as computer executable instructions. Thus, in one example, a tangible media may store computer executable instructions that if executed by a machine (e.g., processor) cause the machine to perform method 100. While executable instructions associated with method 100 are described as being stored on a tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 2:
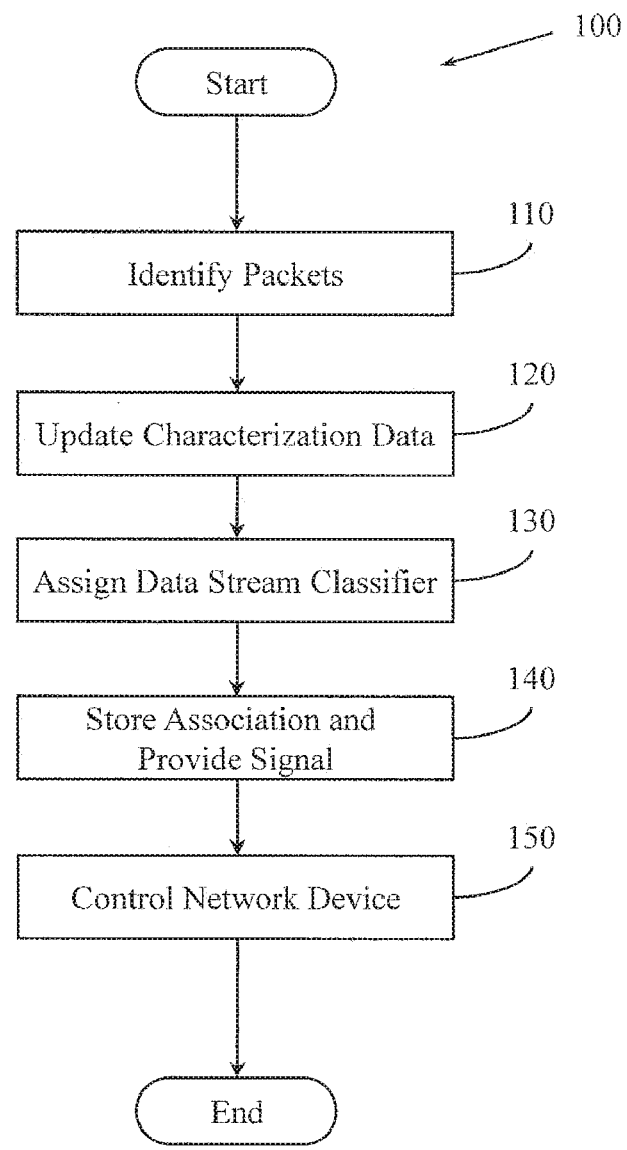
FIG. 2 illustrates another embodiment of an example method associated with data stream classification.

FIG. 2 illustrates another embodiment of method 100. In addition to identifying packets at 100, updating characterization data at 120, assigning a data stream classifier at 130, and storing an association and providing a signal at 140, this embodiment of method 100 includes, at 150, controlling a network device. In one example the network device may be controlled by the signal provided at 140. Thus, the signal may control the network device to modify a quality of service setting for the data stream. The signal may also control the network device to modify a set of bandwidth data associated with the data stream. In one example, the bandwidth data may describe how a company associated with the data stream is billed. Thus, this embodiment of method 100 may allow network devices processing the VoiP packets between Dalton and Wade to prioritize future packets in the data stream, reducing the likelihood that the call is dropped. Additionally, if the owner of the network device has a special agreement with a company associated with the VoiP application facilitating the call, this embodiment of method 100 may enable the owner to monitor and/or perform his role in the agreement. Thus, method 100 may facilitate providing a high quality of service to time sensitive communications.

Figure 4:
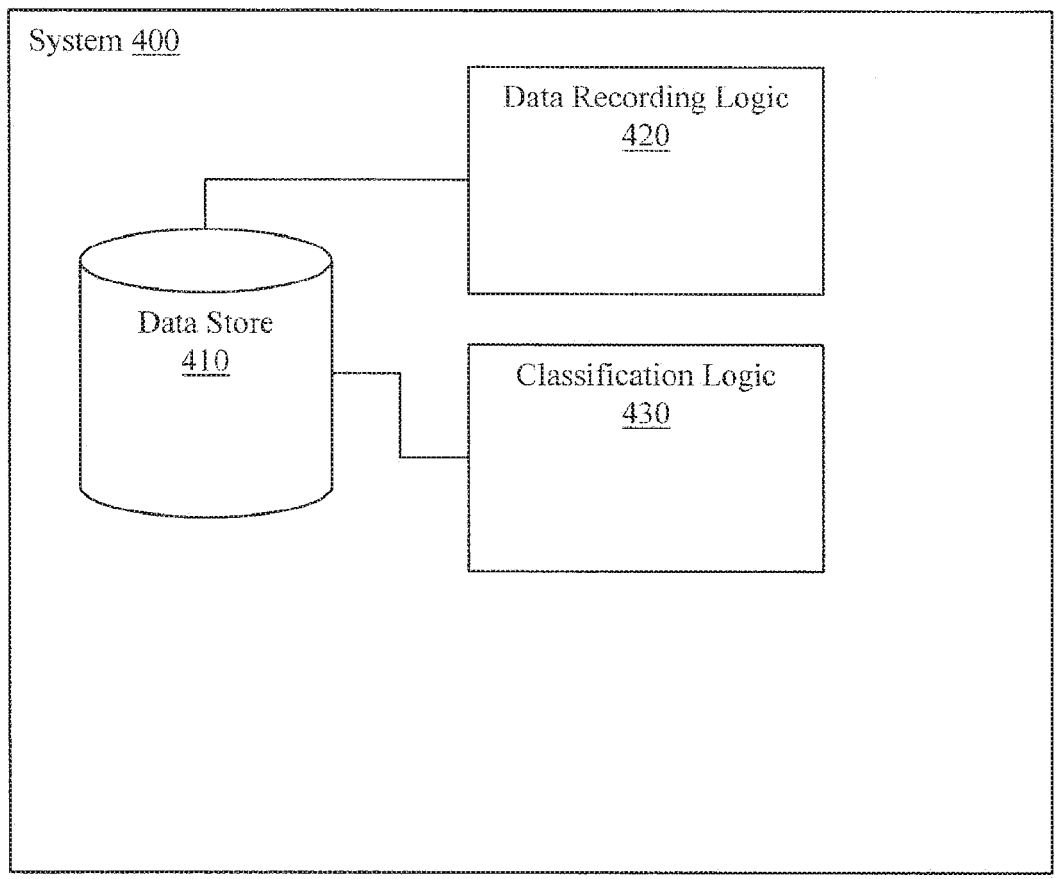
FIG. 4 illustrates an example system associated with data stream classification.

FIG. 4 illustrates a system 400 associated with data stream classification. System 400 includes a data store 410. Data store 410 may store a set of classification information associated with a data stream. The set of classification information may comprise a set of classification statistics and a data stream classifier. As described above, a data stream is associated with an application (e.g., a VONAGE® VoiP application, a SKYPE® VoiP application, a streaming media application, and so forth), and comprises a sequence of packets transmitted from a source device to a destination device.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

System 400 also includes a data recording logic 420. Data recording logic 420 may update the set of classification statistics in data store 410 based on lightweight computations performed on packets from the data stream. A lightweight computation is a computation that relies on a property of a packet Thus, lightweight computations may include calculating a size of a packet, a time a packet arrived, an interval time between two packets, and so forth. Lightweight computations may also include examining networking data (e.g., protocol, source port, destination IP address, and so forth) that is contained in the packet Lightweight computations do not include examining packet payload contents (e.g., deep packet inspection). However, system 400 may include other logics (not shown) that do perform deep packet inspection for other classification steps and/or other purposes.

Figure 5:
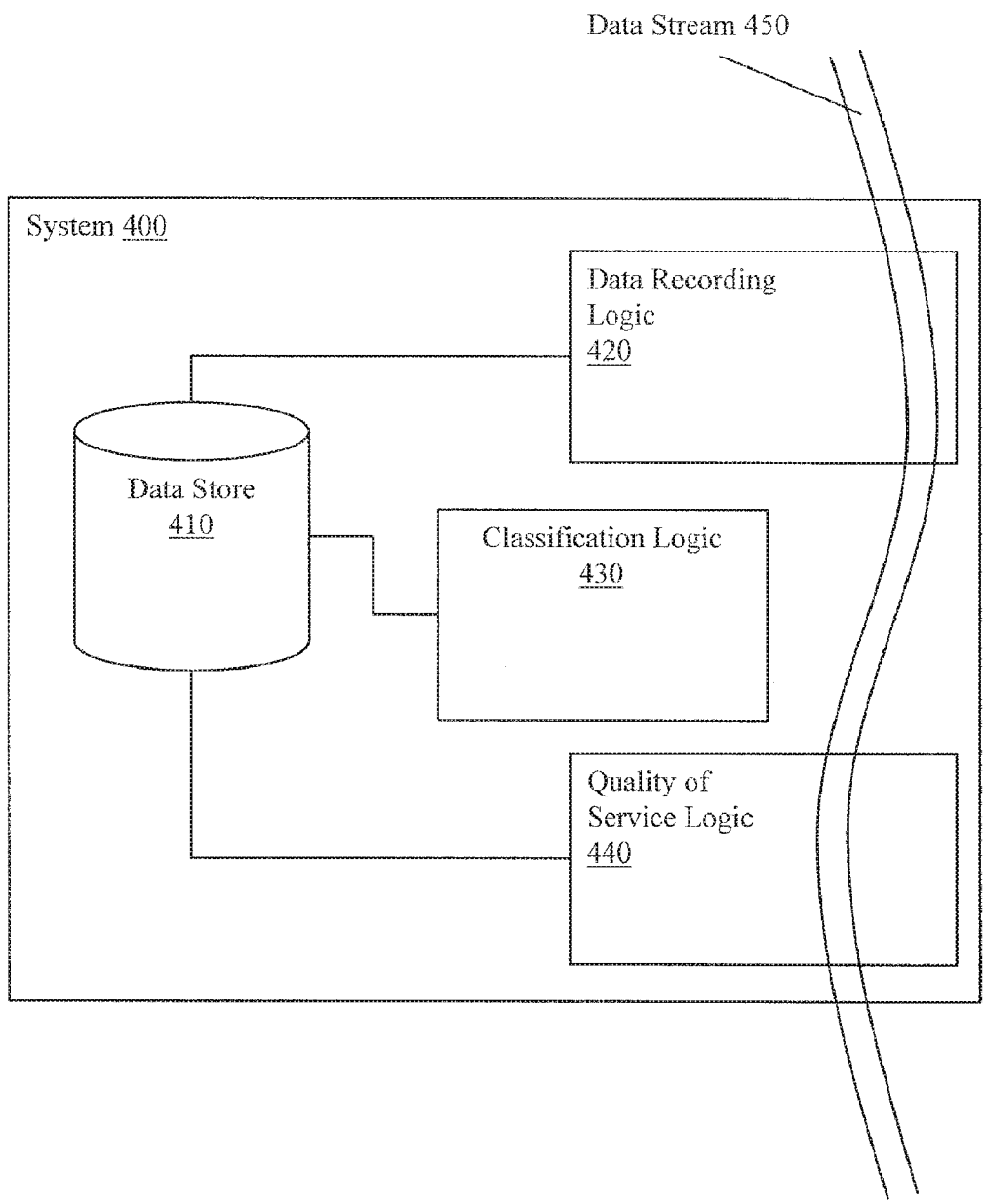
FIG. 5 illustrates another embodiment of an example system associated with data stream classification.

"Logic", as used herein with reference to FIGS. 4 and 5, includes but is not limited to hardware, firmware, software in execution on a machine, and/or combinations of each to perform a function(s) or an action(s), and/or to cause a function or action from another logic, method, and/or system. Logic may include a software controlled microprocessor, discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

System 400 also includes a classification logic 430. Classification logic 430 may update the data stream classifier in data store 410. The data stream classifier may be updated when classification logic 430 determines that a portion of the set of classification statistics indicates that a threshold probability that the data stream is able to be classified has been achieved. In one example, the data stream classifier may be updated by comparing a portion of the classification statistics to a set of identification data (e.g., training data). Comparing a portion of the classification statistics to the set of identification data may include comparing average packet size data, standard deviation of packet size data, average interval time between packets data, standard deviation of interval time between packets data, histogram data, cross correlation data, packet distribution data, and so forth. The identification data may include a value that is a function of a set of average packet size data, a set of average interval time between packets data, a set of standard deviation of packet size data, and a set of standard deviation of interval time between packets data, and so forth (e.g., packet size variance). While several statistics are described, a person having ordinary skill in the art will recognize that a number of other statistics may be applicable for determining an application with which a data stream is associated.

FIG. 5 illustrates another embodiment of system 400. In addition to a data store 410, a data recording logic 420, and a classification logic 430, this embodiment of system 400 includes a quality of service logic 440. Quality of service logic 440 may control packet handling in a data stream 450. Thus, as data stream 450 is processed by system 400, data recording logic 420 updates statistics about packets in the data stream in the data store 410, classification logic 430 determines an application with which data stream 450 is associated, and quality of service logic 440 performs a quality of service on packets in data stream 450 based on the application. Thus, this embodiment of system 400 may be a network device similar to the one described above in reference to the VoiP phone call between Dalton and Wade. This network device may be able to increase quality of service for data streams originating from the VoiP application being used by Dalton and Wade. The network device may also allow the owner of the network device to track overall usage of the VoiP application and charge the owner of the application appropriate fees.

While FIG. 4 illustrates an embodiment of a data stream classification system associated with quality of service control, there may be other situations where data stream classification is applicable. For example, the above example describes how a network device may be able to analyze network activity and provide a real world benefit (e.g. charge a fee) based on an effective use of data stream analysis. Other uses of data stream classification may include network activity analysis, data reporting, and so forth.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 6:
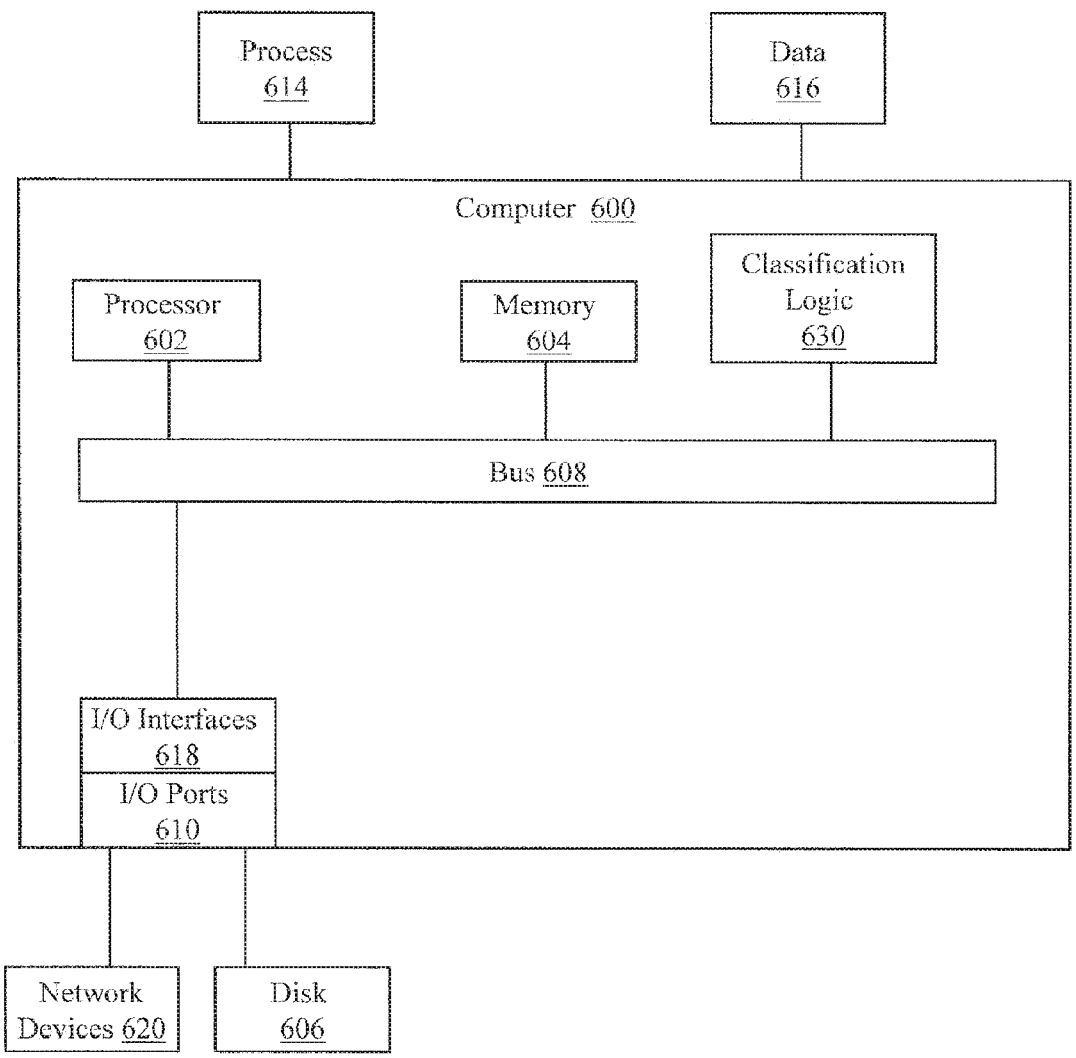
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. While a computer 600 is described, a person having ordinary skill in the art can see how some systems and methods may also operate within a network device (e.g., a router, a bridge, a switch, and so forth). In one example, the computer 600 may include a classification logic 630 configured to facilitate classifying data streams. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for storing a set of classification statistics associated with a data stream and for storing a data stream classifier. Logic 630 may also provide means (e.g., hardware, software, firmware) for updating the set of classification statistics based on data associated with packets from the data stream. Logic 630 may also provide means (e.g., hardware, software, firmware) for transforming the data stream classifier by comparing a portion of the set of classification statistics to a set of identification data. Transforming the data stream classifier may be performed upon determining that the set of classification statistics indicates that a threshold probability that the data stream is able to be classified has been achieved. The means associated with logic 630 may be implemented, for example, as an application specific integrated circuit (ASIC). The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, programmable ROM, and so on. Volatile memory may include, for example, RAM, static RAM, dynamic RAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, or another optical medium. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., peripheral component interconnect express, 1394, universal serial bus (USB), Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network, a wide area network, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims {e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBG, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable storage medium storing one or more instructions which, when executed by one or more processors, cause the one or more processors to perform:
    controlling, by a server computer, a network computer to identify data packets associated with a data stream originated by a user application;
    controlling, by the server computer, the network computer to update a set of characterization data that facilitates identifying the user application that originated the data stream and comprises a set of classification statistics computed from data specific to the data packets;
    based, at least in part, on a portion of the set of characterization data, determining, by the server computer, a data stream classifier for the data stream;
    causing the network computer to provide a signal determined based on the data stream classifier;
    based, at least in part, on the signal, controlling the network computer to modify a quality of service setting for the data stream.

2. The non-transitory computer-readable storage medium of claim 1, storing additional instructions which, when executed, cause the one or more processors to perform:
    based, at least in part, on the signal, determining whether to set the quality of service setting to a high quality of service value;
    in response to determining that the quality of service setting is to be set to the high quality of service value, modifying the quality of service setting for the data stream by setting the high quality of service value for the user application.

3. The non-transitory computer-readable storage medium of claim 1, storing additional instructions which, when executed, cause the one or more processors to perform:
    based, at least in part, on the signal, determining whether to set the quality of service setting to a low quality of service value;
    in response to determining that the quality of service setting is to be set to the low quality of service value, modifying the quality of service setting for the data stream by setting the low quality of service value for the user application.

4. The non-transitory computer-readable storage medium of claim 1, storing additional instructions which, when executed, cause the one or more processors to perform:
    based, at least in part, on the signal, determining whether to increase the quality of service setting;
    in response to determining that the quality of service setting is to be increased, modifying the quality of service setting for the data stream by increasing the quality of service setting for the user application.

5. The non-transitory computer-readable storage medium of claim 1, storing additional instructions which, when executed, cause the one or more processors to perform:
    based, at least in part, on the signal, determining whether to decrease the quality of service setting;

in response to determining that the quality of service setting is to be decreased, modifying the quality of service setting for the data stream by decreasing the quality of service setting for the user application.

6. The non-transitory computer-readable storage medium of claim 1, storing additional instructions which, when executed, cause the one or more processors to perform:
based, at least in part, on the signal, controlling the network computer to modify a set of bandwidth data associated with the data stream;
wherein the set of bandwidth data facilitates one or more of: determining billing information, analyzing network activity, or reporting network usage.

7. The non-transitory computer-readable storage medium of claim 1,
wherein identifying the data packets associated with the data stream comprises comparing a set of state data associated with a packet to a 5-tuple flow definition that describes the data stream;
wherein comparing a set of state data associated with a packet to a 5-tuple flow definition that describes the data stream comprises performing one or more of:
comparing a source interne protocol (IP) address associated with the packet to a source IP address associated with the data stream;
comparing a destination IP address associated with the packet to a destination IP address associated with the data stream;
comparing a source port number associated with the packet to a source port number associated with the data stream; or
comparing a destination port number associated with the packet to a destination port number associated with the data stream.

8. The non-transitory computer-readable storage medium of claim 1, storing additional instructions which, when executed, cause the one or more processors to perform:
determining that the set of characterization data indicates that a threshold probability has been achieved by examining the data packets and calculating statistical information for the data packets;
wherein the statistical information for the data packets includes one or more of: an average packet size, a standard deviation of a packet interval, or a count of packets received during a time period.

9. The non-transitory computer-readable storage medium of claim 1, storing additional instructions which, when executed, cause the one or more processors to perform:
determining the data stream classifier for the data stream by performing one or more of: comparing average packet size data, comparing standard deviation of packet size data, comparing average interval time between packets data, or comparing standard deviation of interval time between packets data.

10. The non-transitory computer-readable storage medium of claim 1, storing additional instructions which, when executed, cause the one or more processors to perform:
causing the network computer to assign the data stream classifier to the data stream to allow identifying the data packets originated by the user application based on the data stream classifier;
wherein the data stream classifier identifies one of: an VoIP application, a file sharing application, a file transfer protocol (FTP) application, an internet browser, a chat application, a gaming application, a video application, an audio application, a conferencing application.

11. A computer-implemented, data processing method comprising:
controlling, by a server computer, a network computer to identify data packets associated with a data stream originated by a user application;
controlling, by the server computer, the network computer to update a set of characterization data that facilitates identifying the user application that originated the data stream and comprises a set of classification statistics computed from data specific to the data packets;
based, at least in part, on a portion of the set of characterization data, determining, by the server computer, a data stream classifier for the data stream;
causing the network computer to provide a signal determined based on the data stream classifier;
based, at least in part, on the signal, controlling the network computer to modify a quality of service setting for the data stream.

12. The computer-implemented, data processing method of claim 11, comprising:
based, at least in part, on the signal, determining whether to set the quality of service setting to a high quality of service value;
in response to determining that the quality of service setting is to be set to the high quality of service value, modifying the quality of service setting for the data stream by setting the high quality of service value for the user application.

13. The computer-implemented, data processing method of claim 11, comprising:
based, at least in part, on the signal, determining whether to set the quality of service setting to a low quality of service value;
in response to determining that the quality of service setting is to be set to the low quality of service value, modifying the quality of service setting for the data stream by setting the low quality of service value for the user application.

14. The computer-implemented, data processing method of claim 11, comprising:
based, at least in part, on the signal, determining whether to increase the quality of service setting;
in response to determining that the quality of service setting is to be increased, modifying the quality of service setting for the data stream by increasing the quality of service setting for the user application.

15. The computer-implemented, data processing method of claim 11, comprising:
based, at least in part, on the signal, determining whether to decrease the quality of service setting;
in response to determining that the quality of service setting is to be decreased, modifying the quality of service setting for the data stream by decreasing the quality of service setting for the user application.

16. The computer-implemented, data processing method of claim 11, comprising:
based, at least in part, on the signal, controlling the network computer to modify a set of bandwidth data associated with the data stream;
wherein the set of bandwidth data facilitates one or more of: determining billing information, analyzing network activity, or reporting network usage.

17. The computer-implemented, data processing method of claim 11, wherein identifying the data packets associated with the data stream comprises comparing a set of state data associated with a packet to a 5-tuple flow definition that describes the data stream;

wherein comparing a set of state data associated with a packet to a 5-tuple flow definition that describes the data stream comprises performing one or more of:

comparing a source internet protocol (IP) address associated with the packet to a source IP address associated with the data stream;

comparing a destination IP address associated with the packet to a destination IP address associated with the data stream;

comparing a source port number associated with the packet to a source port number associated with the data stream; or comparing a destination port number associated with the packet to a destination port number associated with the data stream.

18. The computer-implemented, data processing method of claim 11, comprising:

determining that the set of characterization data indicates that a threshold probability has been achieved by examining the data packets and calculating statistical information for the data packets;

wherein the statistical information for the data packets includes one or more of: an average packet size, a standard deviation of a packet interval, or a count of packets received during a time period.

19. The computer-implemented, data processing method of claim 11, comprising:

determining the data stream classifier for the data stream by performing one or more of:

comparing average packet size data, comparing standard deviation of packet size data, comparing average interval time between packets data, or comparing standard deviation of interval time between packets data.

20. The computer-implemented, data processing method of claim 11, comprising:

causing the network computer to assign the data stream classifier to the data stream to allow identifying the data packets originated by the user application based on the data stream classifier;

wherein the data stream classifier identifies one of: an VoIP application, a file sharing application, a file transfer protocol (FTP) application, an internet browser, a chat application, a gaming application, a video application, an audio application, a conferencing application.

* * * * *